United States Patent
Ikeda et al.

(10) Patent No.: US 6,760,146 B2
(45) Date of Patent: Jul. 6, 2004

(54) LIGHT MODULATION ELEMENT, GLV DEVICE, AND LASER DISPLAY

(75) Inventors: Koichi Ikeda, Kanagawa (JP); Tatsuo Fukui, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 10/189,417

(22) Filed: Jul. 8, 2002

(65) Prior Publication Data

US 2003/0035197 A1 Feb. 20, 2003

(30) Foreign Application Priority Data

Jul. 6, 2001 (JP) .................................... P2001-206453

(51) Int. Cl.[7] .............................................. G02B 26/00
(52) U.S. Cl. ...................... 359/291; 359/290; 359/298
(58) Field of Search ...................... 359/298–99, 290–92

(56) References Cited

U.S. PATENT DOCUMENTS 6,172,797 B1 * 1/2001 Huibers ....................... 359/291
6,618,187 B2 * 9/2003 Pilossof ....................... 359/295
6,654,157 B2 * 11/2003 Islam et al. .................. 359/291
6,661,561 B2 * 12/2003 Fitzpatrick et al. ......... 359/291
2001/0040661 A1 * 11/2001 Ohta et al. .................. 349/141

* cited by examiner

*Primary Examiner*—Jordan M. Schwartz
*Assistant Examiner*—Jessica Stultz
(74) *Attorney, Agent, or Firm*—Rader, Fishman & Grauer PLLC; Ronald P. Kananen (57) ABSTRACT

A light-modulation element is constituted as a light-modulation element for constituting a GLV device and has the same constitution as the conventional light-modulation element except for differing in the structure of the combined light-reflective film and membrane-side electrode of a membrane. The combined light-reflective film and membrane-side electrode is composed of a two-layer metallic film forming a TiN film of 10 nm to 70 nm in thickness provided as a lower layer and an Al film of 50 nm to 150 nm in thickness provided thereon. In the combined light-reflective film and membrane-side electrode, the Al film has a smooth reflective surface and a high light-reflectance, so that the light-utilization efficiency of the light-modulation element is high.

5 Claims, 6 Drawing Sheets

LIGHT MODULATION ELEMENT, GLV DEVICE, AND LASER DISPLAY

BACKGROUND OF THE INVENTION

The present invention relates to a light-modulation element, a GLV device, and a laser display. More particularly, the present invention relates to a light-modulation element including a combined light-reflective film and a membrane-side electrode having a high reflectance, a GLV device including the light-modulation elements, and a laser display including such a GLV device or devices.

Attendant on the progress of miniaturizing technology, attention has been paid to the so-called micromachine (MEMS: Micro Electro-Mechanical System) element and small-type apparatuses incorporating the MEMS element or elements.

The MEMS element is formed as a miniaturized structure on a substrate such as a silicon substrate a glass substrate, and the like, in which a driver for outputting a mechanical driving force and a semiconductor integrated circuit or the like for controlling the driving of the driver are coupled electrically and, further, mechanically. A basic characteristic of the MEMS element lies in that the driver constituted as a mechanical structure is incorporated in a part of the element, and the driving of the driver is performed electrically by application of a coulomb attractive force between electrodes or the like.

The constitution of a light-modulation element will be described by showing as an example the light-modulation element provided in the GLV (Grating Light Valve) device developed as a light-intensity conversion element, namely, a light modulator for laser display, by SLM (Silicon Light Machine) Company.

Figure 5:
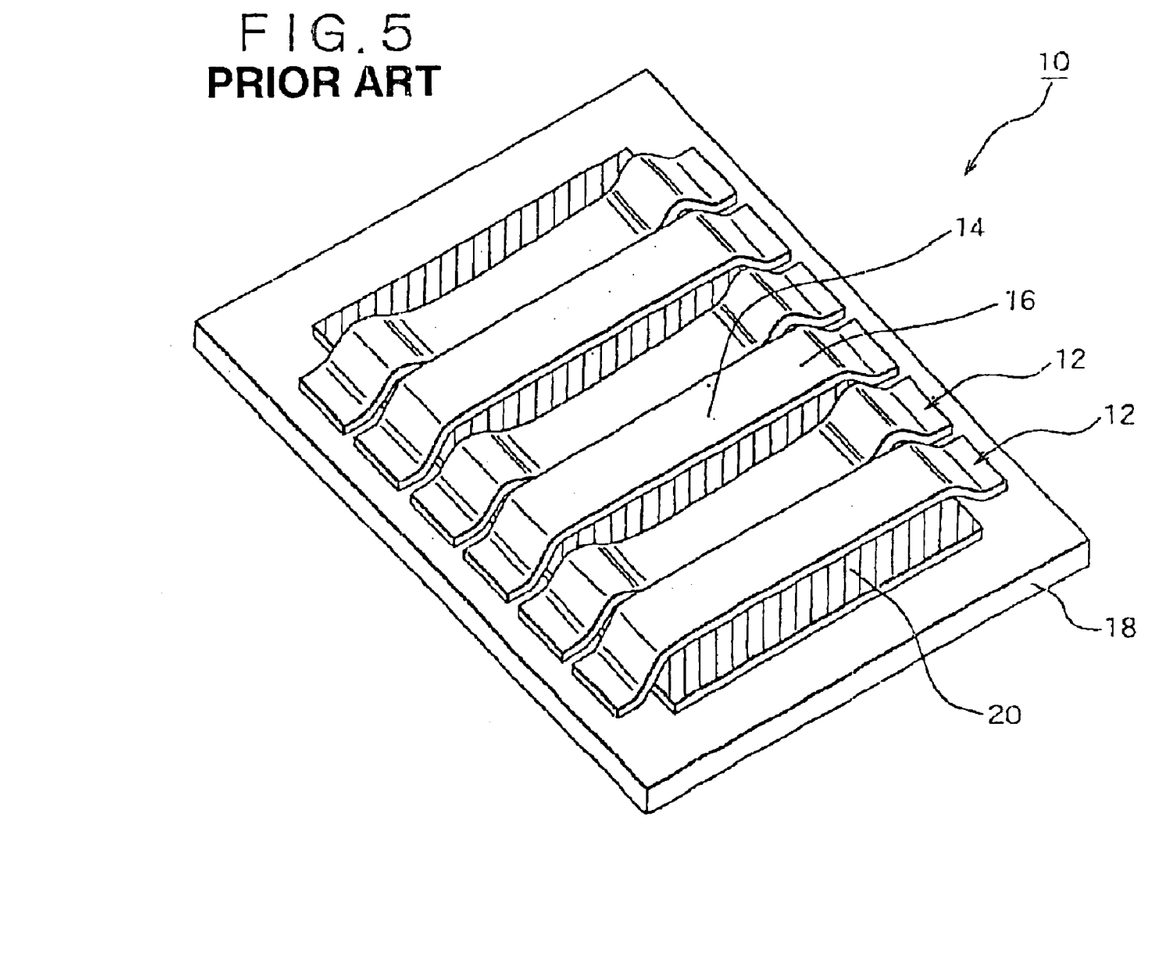
FIG. 5 is a perspective view showing the constitution of a GLV device.

First, referring to FIG. 5, the structure of the GLV device including the light-modulation elements will be described. FIG. 5 is a perspective view showing the constitution of the GLV device.

As shown in FIG. 5, the GLV device 10 is a device in which a plurality of light-modulation elements 12 are disposed densely and in parallel to each other. Each of the light-modulation elements 12 constituting the GLV device 10 is a light-modulation element called MOEMS (Micro Optical Electric Mechanical System) including an electrostatic-driving-type membrane 16 having a light-reflective film 14 on the upper side thereof, and it has the function of modulating the intensity of light reflected by the light-reflective film 14 by diffraction of light through alternate variation of the height of the light-reflective film 14 as a result of mechanical movements of the membrane 16 by an electrostatic attracting force or an electrostatic repelling force.

Figure 6:
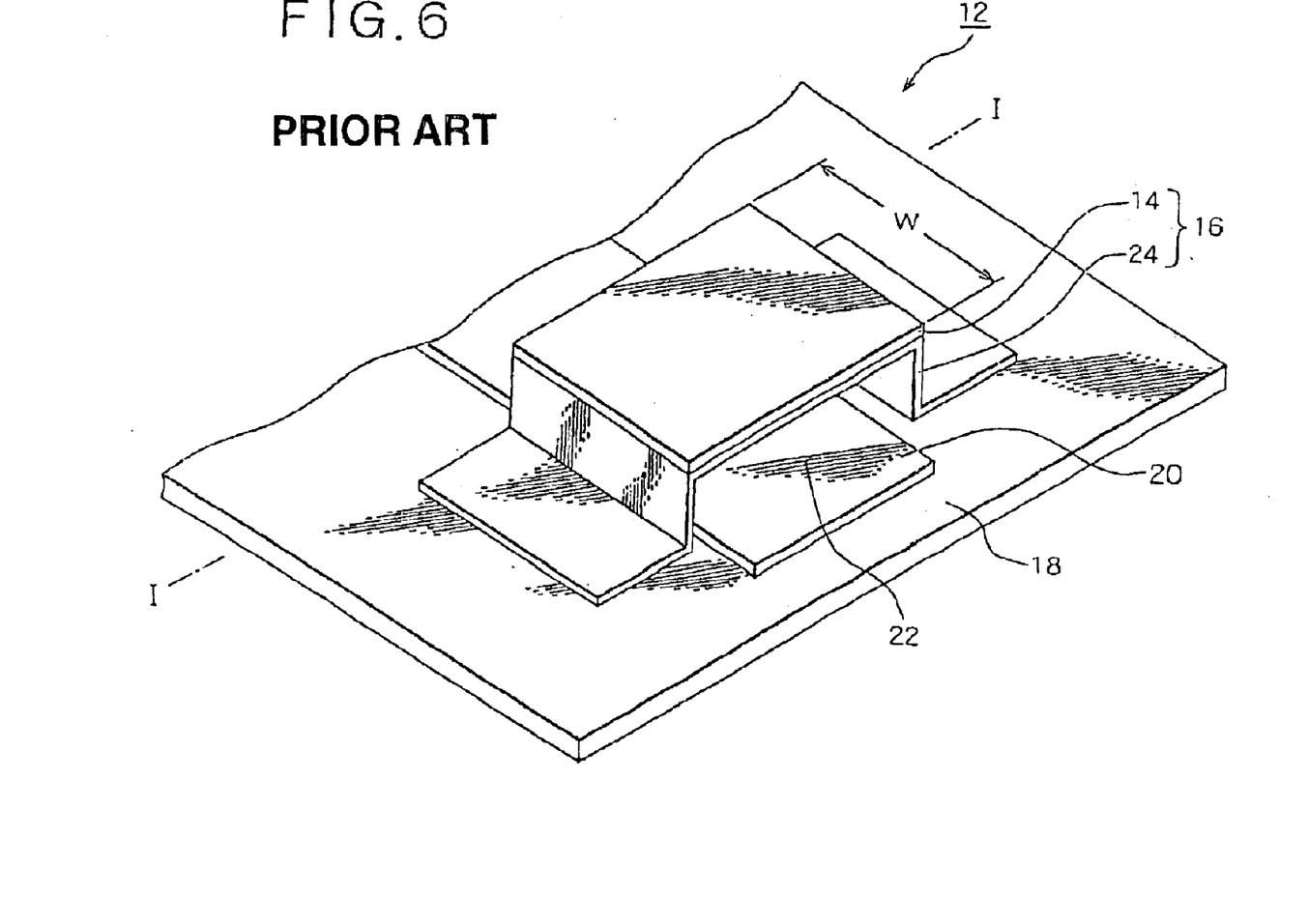
FIG. 6 is a perspective view showing the constitution of a conventional light-modulation element.

Next, referring to FIG. 6, the constitution of the light-modulation element 12 will be described. FIG. 6 is a perspective view showing the constitution of the light-modulation element.

As shown in FIG. 6, the light-modulation element 12 includes an insulating substrate 18, such as a glass substrate, a substrate-side electrode 20 composed of a thin Cr film or the like and formed on the insulating substrate 18, and the electrostatic-driving-type membrane 16 crossing and being astride the substrate-side electrode 20 in a bridge form.

The electrostatic-driving-type membrane 16 and the substrate-side electrode 20 are electrically isolated from each other by a void portion 22 therebetween.

The electrostatic-driving-type membrane 16 includes a bridge member 24 composed of an SiN film provided as an electrode-support member and based on the substrate 18 bridgingly astride the substrate-side electrode 20, and a combined light-reflective film and membrane-side electrode 14 composed of an Al film of about 100 nm in thickness that is provided on the bridge member 24 oppositely to and in parallel to the substrate-side electrode 20.

The bridge member 24 is opposed to and spaced by a predetermined gap from the substrate-side electrode 20 so as to secure the void portion 22 therebetween, and it is provided for supporting the combined light-reflective film and membrane-side electrode 14 in parallel to the substrate-side electrode 20.

In the GLV device 10, the insulating substrate 18 and the substrate-side electrode 20 thereon are respectively a common substrate and a common electrode for the light-modulation elements 12, as shown in FIG. 5.

The electrostatic-driving-type membrane 16 constituted of the bridge member 24 and the combined light-reflective film and membrane-side electrode 14 provided thereon is a portion called a ribbon.

The bridge member 24 may in some cases be of the cantilever type in which only one end of a beam portion extending in parallel to the substrate-side electrode 20 is supported by one column portion, in place of the bridge form shown in FIG. 6 in which both ends of the beam portion are supported by two column portions, respectively.

The aluminum film (Al film) used as the combined light-reflective film and membrane-side electrode 14 is a metallic film preferable as an optical component material on the ground that (1) it is a metallic film which can be formed comparatively easily, (2) it has a small wavelength dispersion of light reflectance in the visible ray region, (3) a spontaneously oxidized alumina film formed on the surface of the Al film functions as a protective film for protecting the reflective surface, and the like.

On the other hand, the SiN film (silicon nitride film) constituting the bridge member 24 is a film deposited by a low-pressure CVD process. The SiN film is selected on the ground that its physical properties, such as strength and elastic constant, are suitable for mechanical driving of the bridge member 24.

When a minute voltage is impressed between the substrate-side electrode 20 and the combined light-reflective film and membrane-side electrode 14 opposed to the substrate-side electrode 20, the electrostatic-driving-type membrane 16 approaches the substrate-side electrode 20 due to an electrostatic phenomenon, and when the impressing of the voltage is stopped, the electrostatic-driving-type membrane 16 is spaced away from the substrate-side electrode 20 into its original state.

Each of the light-modulation elements 12 constituting the GLV device 10 modulates the intensity of the light reflected by the light reflective film 14 by diffraction of light as a result of alternative variation of the height of the light-reflective film 14 through the approaching and spacing actions of the electrostatic-driving-type membrane 16 relative to the substrate-side electrode 20.

The dynamic characteristics of the membrane 16 driven by utilizing the electrostatic attracting force and electrostatic repelling force are substantially determined by the physical properties of the SiN film formed by a CVD process or the like, and the Al film plays a main role as a mirror or reflector.

In the conventional light-modulation element, however, since the combined light-reflective film and membrane-side electrode is composed of an Al film, there have been the following problems. Namely, although the Al film has the above-mentioned merits, the material is comparatively low in melting point and is soft. Therefore, when a thin Al film of about 100 nm in thickness is formed, differences in thickness of the Al film are generated due to aggregation of aluminum. In addition, when the differences in height are as large as not less than 400 nm, a rough surface reaching to 1 μm is generated in the Al film, and light reflectance of the Al film is lowered. For example, while the bulk Al film has a light reflectance of about 92% for light with a wavelength of 600 nm, the light reflectance of the conventional light-modulation element 10 is about 86.5% for the wavelength of 600 nm; thus; there is a lowering in reflectance by about 5%.

Besides, when the differences in thickness generated in the Al film are extremely large, the Al film may be broken, resulting in an electrically non-conductive state. In such a case, driving of the membrane cannot be achieved, and the light-modulation element cannot function.

SUMMARY OF THE INVENTION

Accordingly, it is an object of the present invention to provide a light-modulation element including a combined light-reflective film and membrane-side electrode being uniform in thickness and having a high light reflectance.

The present inventors found out that the variation in the thickness of the Al film is generated as a result of the promotion of migration of aluminum because the Al film formed on an amorphous SiN film is formed by a low-pressure CVD process.

However, it is difficult to find an appropriate membrane film that can be used in place of the SiN film, and it is preferable to utilize the good light reflectivity of Al film by providing the Al film as an upper layer, from the viewpoint of light reflectivity.

In view of this, the present inventors gained the idea of intermediately providing a high-melting-point metal film, for example, a titanium film, and forming crystals with a columnar, fine-grain structure between the SiN film and the Al film so as to restrain the migration of aluminum by the good surface condition of the high-melting-point metal film. The present inventors have confirmed the effects of this idea by experiments to reach to the present invention.

In accordance with one aspect of the present invention, there is provided a light-modulation element including a substrate-side electrode provided on an insulating substrate, and a membrane including a bridge member extending above and spaced from the substrate-side electrode in the manner of crossing the substrate-side electrode, the bridge member having at least an upper layer thereof composed of an SiN film, and a combined light-reflective film and membrane-side electrode composed of a metallic film provided on the SiN film of the bridge member oppositely to the substrate-side electrode, the membrane driving said light-reflective film by an electrostatic attracting force or an electrostatic repelling force acting between the combined light-reflective film and membrane-side electrode and the substrate-side electrode, wherein a multilayer metallic film including an Al film constituted mainly of aluminum (Al) and at least any of a high-melting-point metal film, a high-melting-point metal nitride film, and a high-melting-point metal carbide film provided under the Al film is provided as the combined light-reflective film and membrane-side electrode.

The present invention can be applied to a light-modulation element in which at least an upper layer of a bridge member is composed of an SiN film. The bridge member may be entirely composed of the SiN film, may have a two-layer structure constituting an upper layer composed of the SiN film and a lower layer composed of a film other than the SiN film, for example, an $SiO_2$ film, and, further, may have a three-layer structure.

The Al film may be an Al—Si alloy film, an Al—Cu alloy film, an Al—Cu—Si alloy film, or an Al film containing other impurities.

In the present invention, the Al film is formed on any of a high-melting-point metal film, a high-melting-point metal-nitride film, and a high-melting-point metal-carbide film which has good crystallinity with a columnar, crystal structure so that the Al film has a good crystal structure, and aggregation phenomenon would not easily occur.

Therefore, no variation is generated in the thickness of the Al film, so that the Al film has a smooth reflective surface, light reflectance is enhanced, and light utilization efficiency of the light-modulation element is enhanced.

Preferably, the multilayer metallic film provided as the combined light-reflective film and membrane-side electrode includes a high-melting-point metal film provided on the SiN film of the bridge member and a high-melting-point, metal-nitride film or a high-melting-point, metal-carbide film provided on the high-melting-point metal film.

The high-melting-point metal film has the effect of enhancing adhesion between the high-melting-point, metal-nitride film or the high-melting-point, metal-carbide film and the SiN film.

More preferably, the high-melting-point metal film is any of a titanium (Ti) film, a tungsten (W) film, a molybdenum (Mo) film, and or tantalum (Ta) film, and the high-melting-point, metal-nitride film or the high-melting-point, metal-carbide film is a nitride film or a carbide film of the any of the titanium (Ti) film, the tungsten (W) film, the molybdenum (Mo) film, or the tantalum (Ta) film.

In accordance with another aspect of the present invention, there is provided a GLV device including a plurality of light-modulation elements disposed in parallel to each other, wherein each of the light-modulation elements includes a substrate-side electrode provided on an insulating substrate, and a membrane including a bridge member extending above and spaced from the substrate-side electrode in the manner of crossing the substrate-side electrode, the bridge member having at least an upper layer thereof composed of an SiN film, and a combined light-reflective film and membrane-side electrode composed of a metallic film provided on the SiN film of the bridge member oppositely to the substrate-side electrode, the membrane driving the light-reflective film by an electrostatic attracting force or an electrostatic repelling force acting between the combined light-reflective film and membrane-side electrode and the substrate-side electrode, wherein the combined light-reflective film and membrane-side electrode is a multilayer metallic film including an Al film constituted mainly of aluminum (Al) and at least any of a high-melting-point metal film, a high-melting-point, metal-nitride film, and a high-melting-point, metal-carbide film provided under the Al film, the combined light-reflective films and membrane-side electrodes are independent from each other and disposed in parallel to each other, and the substrate-side electrode is provided as a common electrode.

In accordance with a further aspect of the present invention, there is provided a laser display including a laser and a GLV device disposed on the optical axis of laser light emitted from the laser to modulate the intensity of the laser light, wherein the GLV device includes a plurality of light-modulation elements disposed in parallel to each other; each of the light-modulation elements includes a substrate-side electrode provided on an insulating substrate, and a membrane including a bridge member extending above and spaced from the substrate-side electrode in the manner of crossing the substrate-side electrode, the bridge member having at least an upper layer thereof composed of an SiN film, and a combined light-reflective film and membrane-side electrode composed of a metallic film provided on the SiN film of the bridge member oppositely to the substrate-side electrode, the membrane driving the light-reflective film by an electrostatic attracting force or an electrostatic repelling force acting between the combined light-reflective film and membrane-side electrode and the substrate-side electrode, wherein the combined light-reflective film and membrane-side electrode is a multilayer metallic film including an Al film constituted mainly of aluminum (Al), and at least any of a high-melting-point metal film, a high-melting-point, metal-nitride film, and a high-melting-point, metal-carbide film provided under the Al film, the combined light-reflective films and membrane-side electrodes are independent from each other and disposed in parallel to each other, and the substrate-side electrode is provided as a common electrode.

In the laser display according to the present invention, there is no limitation as to the number of lasers; the laser display may be a monochromic laser display or a full-color display.

In the case of the full-color display, the laser display includes: a red laser, a green laser; a blue laser; a color-combination filter for combining red laser light, green laser light and blue laser light emitted respectively from the red laser, the green laser and the blue laser; and GLV devices disposed on optical axes between the red laser, the green laser, the blue laser, and the color-combination filter for modulating the intensities of the red laser light, the green laser light and the blue laser light emitted respectively from the red laser, the green laser and the blue laser.

According to the present invention, since the ground for the Al film is the high-melting-point metal film or the like, degradation of surface morphology due to aggregation of aluminum in the Al film can be prevented, and a light-modulation element having a high reflectance and, hence, a high light-utilization efficiency can be realized.

By this, it is possible to enhance the reliability of the light modulation element and to increase the production process margin of the light-modulation element.

Further, by composing the GLV device of the light-modulation elements according to the present invention, it is possible to realize a GLV device having a high light-utilization efficiency and a long useful life. Besides, by incorporating such a GLV device or GLV devices in a laser display, it is possible to realize a laser display having a high light-utilization efficiency.

BRIEF DESCRIPTION OF THE DRAWINGS.

These and other objects of the invention will be seen by reference to the description taken in connection with the accompanying drawing, in which.

DETAILED DESCRIPTION OF THE PREFERRED EMBODIMENTS

A mode for carrying out the present invention will be described below concretely and in detail based on embodiments and referring to the accompanying drawings. The film-forming method, compositions of layers, film thickness, process conditions and the like shown in the following embodiments are merely an exemplification for easy understanding of the present invention, and the invention is not limited to or by the exemplification.

Embodiment of Light Modulation Element

Figure 1:
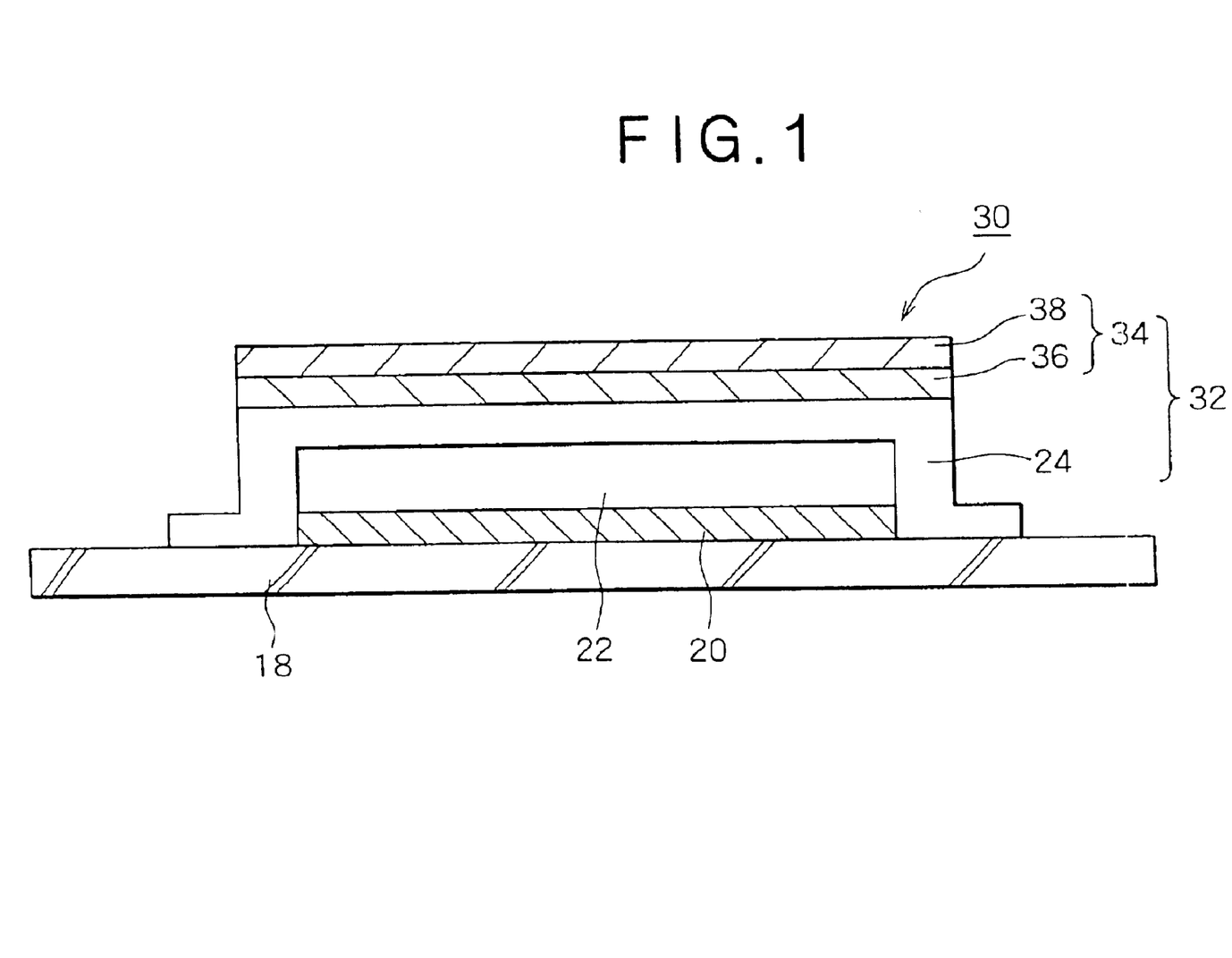
FIG. 1 is a sectional view showing the constitution of a light-modulation element according to an embodiment of the present invention.

The present embodiment is one example of embodying the light-modulation element according to the present invention: and The light-modulation element 30 according to this embodiment is constituted as a light-modulation element for constituting a GLV device, and it has the same constitution as the conventional light-modulation element 12 except for the difference in the structure of the combined light-reflective film and membrane-side electrode 34 of the membrane 32.

As shown in FIG. 1, the combined light-reflective film and membrane-side electrode 34 of this embodiment is composed of a two-layer metallic film forming a TiN film 36 of 10 nm to 70 nm in thickness as a lower layer and an Al film 38 of 50 nm to 150 nm in thickness provided thereon.

Figure 2:
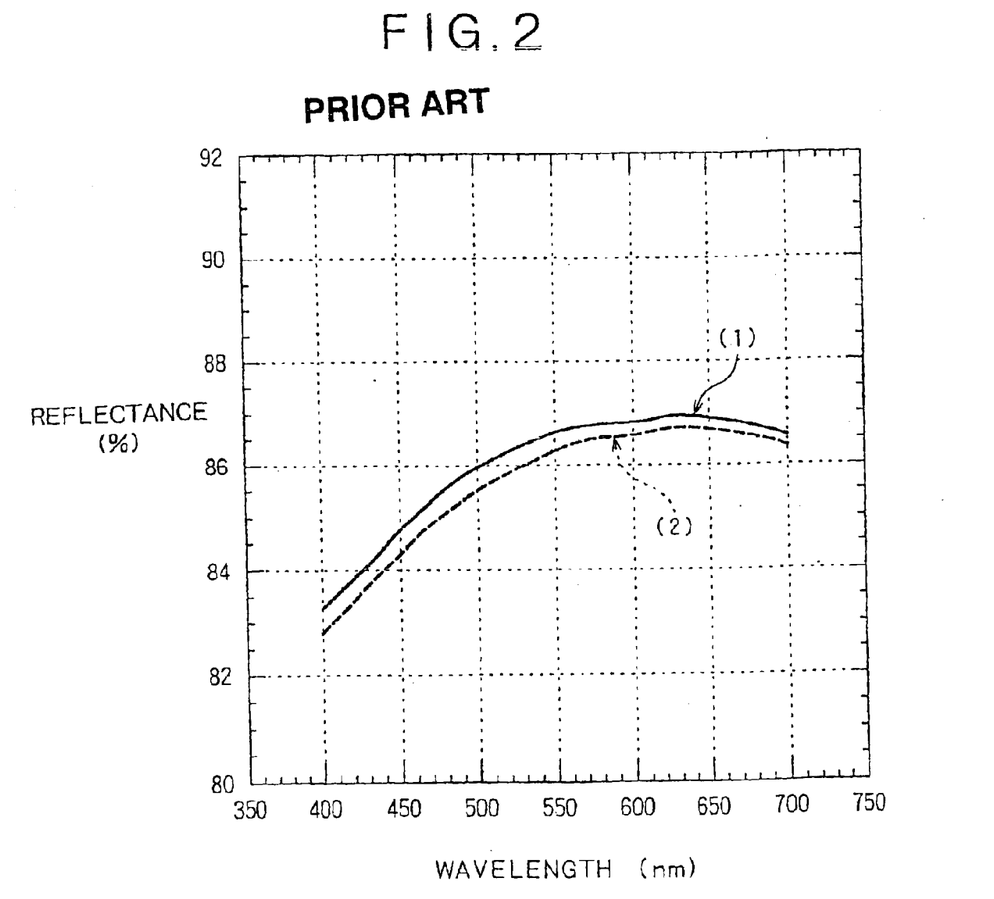
FIG. 2 is a graph showing the light reflectance of the light-modulation element according to the embodiment and the light reflectance of a conventional light modulation element for laser light of 400 nm to 700 nm in wavelength.

A specimen light-modulation element (exclusive of laser) having the same constitution as the light modulation element 30 according to this embodiment was fabricated as a trial, and the reflectance of the combined light-reflective film and membrane-side electrode 34 was measured by irradiating with light of 400 nm to 700 nm in wavelength to obtain the results shown by graph (1) in FIG. 2.

On the other hand, as to the conventional light-modulation element 10, the reflectance was similarly measured, to obtain the results shown by graph (2) in FIG. 2.

From a comparison between graph (1) and graph (2) in FIG. 2, it is seen that the light-modulation element 30 of the present embodiment shows a higher reflectance in the entire region of the measuring wavelength as compared with the conventional light modulation element 10. Particularly, this tendency is conspicuous in the region of shorter wavelength.

Namely, it is shown that the Al film 38 has a smooth reflective surface, and the light utilization efficiency of the light-modulation element 30 is high.

Figure 3A:
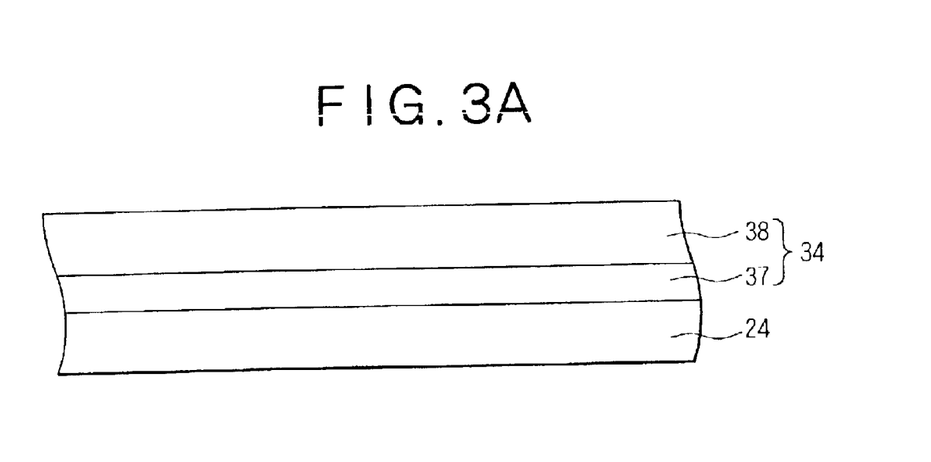
FIGS. 3A and 3B are sectional views showing the constitutions of the combined light-reflective film and membrane-side electrode according to a modified embodiment of the present invention, respectively.

While the light modulation element 30 of the present embodiment includes a multilayer metallic film of a two-layer structure forming the TiN film 36 and the Al film 38 as the combined light-reflective film and membrane-side electrode 34, this is not limitative. For example, as shown in FIG. 3A, a two-layer metallic film forming a Ti film 37 and an Al film 38 may be adopted.

Figure 3B:
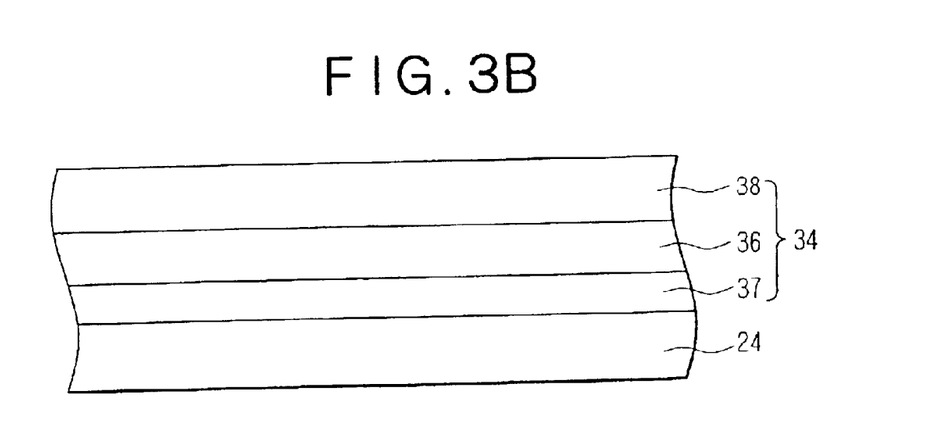

In addition, as shown in FIG. 3B, a three-layer metallic film forming a Ti film 37, a TiN film 36 and an Al film 38 may also be used. The TiN film 37 functions as an adhesive layer for the SiN film.

In the present embodiment, the Ti film and/or the TiN film is used as a high-melting-point metal film, so that there is the merit that the multilayer metallic film forming the Ti film and/or the TiN film and the Al film can be patterned by a single etching step.

In place of the Ti film or the TiN film, a high-melting-point metal film of tungsten (W), molybdenum (Mo), tantalum (Ta) or the like may be used. Further, nitrides and carbides of these high-melting-point metal films are also effective, similarly to the Ti film or the TiN film.

Embodiment of GLV Device

The GLV device in the present embodiment is an example of embodying the GLV device according to the present invention in which the light-modulation elements 30 are used in place of the light-modulation elements 12 used in the GLV device 10 according to the related art described above.

Since the GLV device of this embodiment includes the light-modulation elements 30 having a high light reflectance, its light-utilization efficiency is much higher than that of the conventional GLV device 10.

Embodiment of Laser Display

Figure 4:
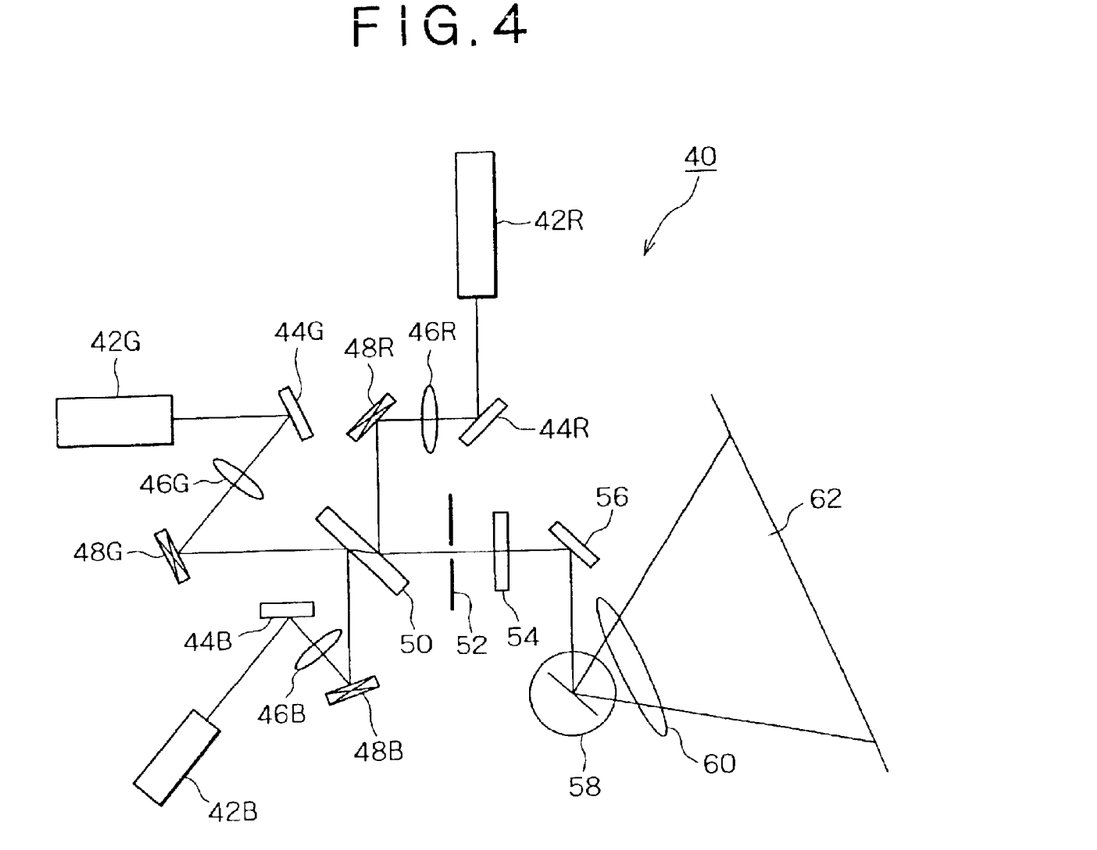
FIG. 4 is a schematic diagram showing the constitution of a laser display according to an embodiment of the present invention.

The present embodiment is an example of embodying the laser display according to the present invention, and FIG. 4 is a schematic diagram showing the constitution of the laser display according to this embodiment.

The laser display 40 of this embodiment is an optical apparatus using the GLV devices according to the above-described embodiment, and is used, for example, as a large-type screen projector, particularly a digital picture projector, or as a computer picture projector.

As shown in FIG. 4, the laser display 40 includes lasers 42R, 42G, 42B provided as laser light sources of red (R), green (G), blue (B) in color, mirrors 44R, 44G, 44B, illumination optical systems 46R, 46G, 46B, and GLV devices 48R, 48G, 48B functioning as light modulators, which are sequentially disposed respectively on optical axes of the light sources.

As the lasers 42R, 42G and 42B, for example, lasers of R (wavelength: 642 nm; light output: about 3 W), G (wavelength: 532 nm; light output: about 2 W) and B (wavelength: 457 nm; light output: about 1.5 W) are used.

Further, the laser display 40 includes a color-combination filter 50 for combining the red (R) laser light, green (G) laser light and blue (B) laser light modulated in light intensity respectively by the GLV devices 48R, 48G and 48B, a space filter 52, a diffuser 54, a mirror 56, a Galvano-scanner 58, a projection optical system 60, and a screen 62.

The color-combination filter 50 is composed, for example, of a dichroic mirror.

In the laser display 40 according to the present embodiment, the R, G, B laser lights emitted from the lasers 42R, 42G, 42B are transmitted through the mirrors 44R, 44G, 44B and the illumination optical systems 46R, 46G, 46B to be incident on the GLV devices 48R, 48G, 48B, respectively. The laser lights are picture signals which are classified in color, and they are synchronously inputted to the GLV devices 48R, 48G, 48B.

Furthermore, the laser lights are space modulated by being diffracted by the GLV devices 48R, 48G, 48B, these three color-diffracted lights are combined by the color-combination filter 50, and then only a signal component is picked up by the space filter 52.

Next, the RGB picture signal is treated by the diffuser 54 to reduce laser speckles, is reflected by the mirror 56, is developed into space by the Galvano-scanner 58 synchronized with the picture signal, and is projected as a full-color picture on the screen 62 by the projection optical system 60.

In the laser display 40, the GLV devices 48 having the same structure for all of RGB are used, whereby the luminous flux of the picture signal emitted is about 310 lumen.

In a laser display having the same structure as the laser display 40 of this embodiment, except for using the conventional light-modulation elements, the luminous flux of the signal is about 300 lumen. It is seen, therefore, that in the laser display 40 according to this embodiment, utilization efficiency of the light sources is enhanced.

Besides, when GLV devices optimized for respective wavelengths of RGB are used, the luminous flux of the signal is further enhanced to about 320 lumen.

While the GLV devices 48R, 48G, 48B are provided correspondingly to the lasers 42 for respective colors in the laser display 40 of this embodiment, the GLV devices also can be applied to various displays having other constitutions.

For example, a structure may be adopted in which the light source is white light, and the GLV devices 48R, 48G, 48B having light-modulation elements differing in membrane width constitute a single pixel so that only the light components with respective wavelengths of RGB are reflected (the other light components are diffracted) to display respective colors.

In addition, a structure is possible in which white light emitted from a single light source is transmitted through color wheels synchronized with picture information forming RGB picture data to be incident on the GLV devices 48.

Furthermore, for example, where a single light-modulation element 48 is used and lights from RGB LEDs (Light Emitting Diodes) are diffracted so as to reproduce color information for individual pixels, a simple handy-type color display is realized.

Besides, the GLV device according to the present invention can be used not only for the projectors, such as the laser display of the present embodiment, but also as various devices for WDM (Wavelength Division Multiplexing) transmission in optical communication, MUX (Multiplexer), DEMUX (Demultiplexer), or light switches such as OADM (Optical Add/Drop Multiplexer) and OXC (Optical Cross Connect).

Furthermore, the GLV device according to the present invention also can be applied to other optical apparatuses, for example, a miniaturized drawing apparatus capable of directly drawing a digital picture or the like, a semiconductor exposure apparatus, a printer engine, or the like.

Besides, while a laser display in which space modulation is conducted by use of the GLV devices 48R, 48G, 48B has been described as the laser display 40 in the present embodiment, the GLV device according to the present invention can perform switching of information capable of being modulated by interference and diffraction, such as phase and light intensity, and can therefore be applied to optical apparatuses utilizing this property.

What is claimed is:

1. A light modulation element comprising a substrate-side electrode provided on an insulating substrate, and a membrane comprising a bridge member extending above and spaced from said substrate-side electrode, said bridge member having at least the upper layer thereof comprised of an SiN film, and a combined light-reflective film and membrane-side electrode composed of a metallic film provided on said SiN film of said bridge member opposite of said substrate-side electrode, said membrane driving said light-reflective film by an electrostatic attracting force or an electrostatic repelling force acting between said combined light-reflective film and membrane-side electrode and said substrate-side electrode, wherein a multilayer metallic film comprising an aluminum film constituted mainly of aluminum (Al) and at least any of a high-melting-point metal film, a high-melting-point metal-nitride film, and a high-melting-point metal-carbide film provided under said aluminum film as provided as said combined light-reflective film and membrane-side electrode.

2. A light-modulation element as set forth in claim 1, wherein said multilayer metallic film provided as said combined light-reflective film and membrane-side electrode comprises a high-melting-point metal film provided on said SiN film of said bridge member and a high-melting-point, metal-nitride film or a high-melting-point, metal-carbide film provided on said high-melting-point metal film.

3. A light modulation element as set forth in claim 2, wherein said high-melting-point metal film is any of a titanium (Ti) film, a tungsten (W) film, a molybdenum (Mo) film, and a tantalum (Ta) film, and said high-melting-point, metal-nitride film or said high-melting-point, metal-carbide film is a nitride film or a carbide film of said any of said titanium (Ti) film, said tungsten (W) film, said molybdenum (Mo) film, and said tantalum (Ta) film.

4. A GLV device comprising a plurality of light-modulation elements disposed in parallel to each other, wherein each of said light modulation elements comprises a substrate-side electrode provided on an insulating substrate, and a membrane comprising a bridge member extending above and spaced from said substrate-side electrode in the manner of crossing said substrate-side electrode, said bridge member having at least the upper layer thereof composed of an SiN film, and a combined light-reflective film and a membrane-side electrode composed of a metallic film provided on said SiN film of said bridge member oppositely to said substrate-side electrode, said membrane driving said light-reflective film by an electrostatic attracting force or an electrostatic repellingi force acting between said combined light-reflective film and membrane-side electrode and said substrate-side electrode, wherein said combined light-reflective film and membrane-side electrode is a multplayer metallic film comprising an aluminum film constituted mainly of aluminum (Al) and at least any of a high-melting-point metal film, a high-melting-point metal-nitride film, and a high-melting point metal-carbide film provided under said aluminum film, said combined light-reflective films and membrane-side electrodes are independent from each other and disposed in parallel to each other, and said substrate-side electrode is provided as a common electrode.

5. A laser display comprising a laser and a GLV device disposed on the optical axis of laser light emitted from said laser to modulate the intensity of said laser light, wherein said GLV device comprises a plurality of light-modulation elements disposed in parallel to each other:

each of said light-modulation elements comprises a substrate-side electrode provided on an insulating substrate, and a membrane comprising a bridge member extending above and spaced from said substrate-side electrode in the manner of crossing said substrate-side electrode, said bridge member having at least the upper layer thereof composed of an SiN film, and a combined light-reflective film and membrane-side electrode composed of a metallic film provided on said SiN film of said bridge member oppositely to said substrate-side electrode, said membrane driving said light-reflective film by an electrostatic attracting force or an electrostatic repelling force acting between said combined light reflective film and membrane-side electrode and said substrate-side electrode, wherein said combined light-reflective film and membrane-side electrode is a multilayer metallic film comprising an aluminum film constituted mainly of aluminum (Al) and at least any of a high-melting-point metal film, a high-melting-point metal-nitride film, and a high-melting-point metal-carbide film provided under said aluminum film, said combined light-reflective films and membrane-side electrodes are independent from each other and disposed in parallel to each other, and said substrate-side electrode is provided as a common electrode.

* * * * *